United States Patent [19]

Ngo

[11] 4,030,091
[45] June 14, 1977

[54] TECHNIQUE FOR INVERTING THE STATE OF A PLASMA OR SIMILAR DISPLAY CELL

[75] Inventor: Peter Dinh-Tuan Ngo, Colts Neck, N.J.

[73] Assignee: Bell Telephone Laboratories, Incorporated, Murray Hill, N.J.

[22] Filed: Jan. 30, 1976

[21] Appl. No.: 653,662

[52] U.S. Cl. .................. 340/324 M; 315/169 R; 340/166 EL; 340/173 PL
[51] Int. Cl.² ........................................ H01J 17/48
[58] Field of Search ... 340/324 M, 173 PL, 166 EL; 315/169 R, 169 TV; 313/217, 220

[56] References Cited

UNITED STATES PATENTS

| | | | |
|---|---|---|---|
| 3,651,509 | 3/1972 | Ngo | 315/169 TV |
| 3,671,938 | 6/1972 | Ngo | 315/169 R |
| 3,761,773 | 9/1973 | Johnson et al. | 340/324 M |
| 3,797,011 | 3/1974 | Petty et al. | 315/169 R |
| 3,801,861 | 4/1974 | Petty et al. | 315/169 TV |
| 3,832,693 | 8/1974 | Ishizaki et al. | 340/173 PL |
| 3,833,832 | 9/1974 | Fein et al. | 315/169 R |
| 3,840,779 | 10/1974 | Schermerhorn | 315/169 R |
| 3,851,210 | 11/1974 | Schermerhorn | 315/169 R |
| 3,851,327 | 11/1974 | Ngo | 340/324 M |
| 3,969,718 | 7/1976 | Strom | 315/169 TV |

OTHER PUBLICATIONS

Slottow & Petty, "Stability of Discharge Series in the Plasma Display Panel", IEEE Transactions on Electron Devices, vol. Ed-18 No.9, Sept. 1971, pp. 650–654.

*Primary Examiner*—David L. Trafton
*Attorney, Agent, or Firm*—Ronald D. Slusky

[57] ABSTRACT

The state of a plasma or similar display cell is inverted by a two-pulse sequence comprising an inverting write pulse followed by an inverting erase pulse. The inverting write pulse switches a cell ON if it was OFF, while the inverting erase pulse switches the cell OFF if it was ON. The inverting write pulse is adapted to cause a gradual, rather than an immediate, wall voltage buildup so that the inverting erase pulse is of insufficient magnitude to turn a cell OFF if it was turned on by the inverting write pulse.

26 Claims, 6 Drawing Figures

TECHNIQUE FOR INVERTING THE STATE OF A PLASMA OR SIMILAR DISPLAY CELL

BACKGROUND OF THE INVENTION

The present invention is directed to a method and arrangement for inverting the states of the cells of a plasma panel, or similar display device, on an individual, addressable basis.

In its most conventional form, a plasma panel is comprised of two dielectric plates, or surfaces, at least one of which is translucent, between which a continuous body of gaseous display material such as neon, is sealed. A first set of "column" conductors is disposed on one plate in a generally vertical direction. A second set of "row" conductors is disposed on the other plate in a generally horizontal direction.

The individual regions of the panel defined by the intersections, or crosspoints, of the various row and column conductors function at its display cells. Pictures, text and other graphical data are presented on the panel by creating individual glow discharges in the gas at selected crosspoints under the control, for example, of a digital computer. The computer initiates a discharge at a particular cell by impressing, or applying, a "write" pulse thereacross via its row and column conductor pair. The magnitude of the write pulse exceeds the breakdown voltage of the gas, and a space charge, or plasma, of electrons and positive ions is created in the crosspoint region. Concomitant avalanche multiplication creates a glow discharge and accompanying short, e.g., one microsecond, light pulse in the visible spectrum. The write pulse, which continues to be applied to the cell, begins to pull the space charge electrons and ions, or charge carriers, to opposite cell walls, i.e., the opposing dielectric surfaces in the crosspoint region. When the write pulse terminates, a "wall" voltage resulting from these so-called wall charges remains stored across the gas at the crosspoint.

A single short-duration light pulse cannot, of course, be detected by the human eye. Thus, in order to provide a plasma display cell with the appearance of being continuously light-emitting (ON, energized), further rapidly successive glow discharges and accompanying light pulses are needed. These are generated by a "sustain" signal which is impressed across each cell of the panel. The sustain signal may comprise, for example, a train of alternating-polarity pulses. The magnitude of these sustain pulses is less than the breakdown voltage. Thus, the voltage across cells not previously energized by a write pulse is insufficient to cause a discharge and those cells remain in a non-light-emitting state.

The voltage across the gas of an ON, i.e., previously-energized, cell, however, comprises the superposition of the sustain voltage with the wall voltage previously stored at that cell. The sustain pulse which follows a write pulse has a polarity opposite thereto. As a result, the wall and sustain voltages combine additively across the gas. The combined voltage may be assumed to exceed the breakdown voltage. Thus, a second glow discharge and accompanying light pulse are created. The flow of carriers to the cell walls now establishes an opposite wall voltage polarity. The polarity of the next sustain pulse is also opposite to that of its predecessor, creating yet another discharge, and so forth. After several sustain cycles, the magnitude of the wall voltage reaches a constant, characteristic level which is a function of the gas composition, panel dimensions, sustain voltage level, and other parameters. The sustain signal frequency may be on the order of 50 kHz. Thus, the light pulses emitted by an ON cell in response to the sustain signal are fused by the eye of the viewer, and the cell appears to be continuously energized.

A cell which has been established in a light-emitting state is switched to a non-light-emitting (OFF, de-energized) state by removing its wall charge. In particular, an "erase" pulse is applied to the cell in question, again via its row and column conductor pair. The erase pulse polarity is opposite to that of the preceding sustain pulse and, although its magnitude is typically somewhat less than that of a sustain pulse, it is of sufficient magnitude to cause a discharge at an ON cell. Thus, the wall voltage begins to reverse polarity. However, the erase pulse is of such short duration relative to a sustain pulse that the wall voltage reversal is terminated prematurely, at a time when the wall voltage magnitude is less than the difference between the breakdown and sustain voltages. Thus, no further breakdowns occur and the cell is returned to an OFF state.

It will be appreciated from the foregoing that a plasma panel has what is referred to as "inherent memory"; once the computer or other controlling apparatus applies a write pulse to a selected cell, the cell remains in an energized state with no further computer intervention. The latter is thus freed for other tasks until some change in the displayed image is to be made. By contrast, a cathode-ray tube (CRT) display, for example, does not have inherent memory; the phosphor regions thereof emit light only in response to an applied electron beam and once the beam passes by a particular region on its scan across the display, the beam leaves behind no evidence that a particular region had been energized. Thus, CRT systems require a separate "frame memory" to store a representation of the image being displayed. The controlling apparatus must continually refer to this memory (typically 30 times per second) to refresh the display, even when the displayed image is not to be changed.

The fact that a typical plasma display system does not have a frame memory is a mixed blessing, however. As is illustrated in the Detailed Description hereof, a number of display applications require, or at least would benefit from, the ability to invert (flip, toggle) the states of one or more cells on a selectable, addressable basis — that is, the ability to change a cell from the particular one of its (illustratively) two states in which it resides to the other of its states. Cell-state inversion is easily accomplished in a display system having a frame memory since the controlling computer, for example, has a record of the state of each display cell and can generate appropriate signals on the basis thereof to modify the displayed image as desired.

By contrast, the computer controlling a plasma panel typically has no such record to which it can refer. Thus, it cannot readily determine whether a write or an erase pulse is needed to invert the state of a particular cell. One solution is to augment the system with the otherwise redundant and unnecessary frame memory. Another is to "read out" (in known manner) the state of the cell to be inverted. Disadvantageously, however, both of these alternatives add appreciably to the cost and complexity of the display system.

SUMMARY OF THE INVENTION

Accordingly, the principal object of the present invention is to provide a simple and inexpensive technique for inverting the states of the cells of a plasma panel, or similar display device, on an individual, addressable basis.

A novel two-pulse cell-state-inversion sequence achieves this object in accordance with the invention. The first pulse of the sequence is an "inverting write" pulse, which inverts a cell to an ON state if it was originally OFF but which, like any write pulse, does not affect the state of the cell if it was originally ON. The second pulse of the sequence is an "inverting erase" pulse, which inverts the cell to an OFF state if it was originaly ON. The inverting erase pulse may be similar or identical to a conventional erase pulse. However, as will now be discussed, the inverting write pulse is uniquely adapted in accordance with the invention to invert a cell from an OFF to an ON state in such a way that the cell is not affected by the following inverting erase pulse, which would otherwise reinvert it to an OFF state.

For a given plasma panel, the initial number of space charge carriers created by a write pulse and drawn to the cell walls thereby is principally determined by the write pulse magnitude and duration. Thus a write pulse, although of sufficient magnitude to cause a gas breakdown, may have insufficient magnitude and/or duration to immediately store a wall voltage at the above/mentioned characteristic level. If, however, the initially-stored wall voltage exceeds a certain threshold level, which is principally determined by the sustain pulse magnitude and duration, the wall voltage builds up to the characteristic level over several sustain cycles.

The time interval, or period, which elapses between the end of a write pulse and the start of the following sustain pulse is an important factor in the wall charge build-up process. For longer periods, more of the charge carriers not pulled to the cell walls by the write pulse are allowed to disappear through recombination or diffusion away from the crosspoint site before the next discharge. This results in a smaller initial wall voltage and it takes an increasing number of sustain cycles to build up the wall voltage to the characteristic level. There reaches a maximum delay period, known as the recovery time, beyond which so many of the initial charge carriers are lost that the wall voltage never reaches the above-mentioned threshold level and never builds up to the characteristic level. Rather, the wall voltage ultimately returns to zero. For a particular panel, the recovery time is principally a function of the magnitude and duration of the write pulse used.

The present invention takes advantage of the wall voltage build-up mechanism just described. The inverting write pulse is of sufficient magnitude, duration and proximity to the following sustain pulse to ensure that an OFF cell to which it is applied is ultimately established in an ON state. These three parameters are adjusted, however, such that the wall voltage level which obtains at the point in time that the inverting erase pulse is applied to the cell in question is insufficient in combination with the pulse to effect a gas breakdown and remove the incipient wall charge. The inverting erase pulse thus only erases a cell which has been ON for a number of sustain cycles, and thus at which the wall voltage is assured to be at its characteristic level.

DETAILED DESCRIPTION

Figure 1:
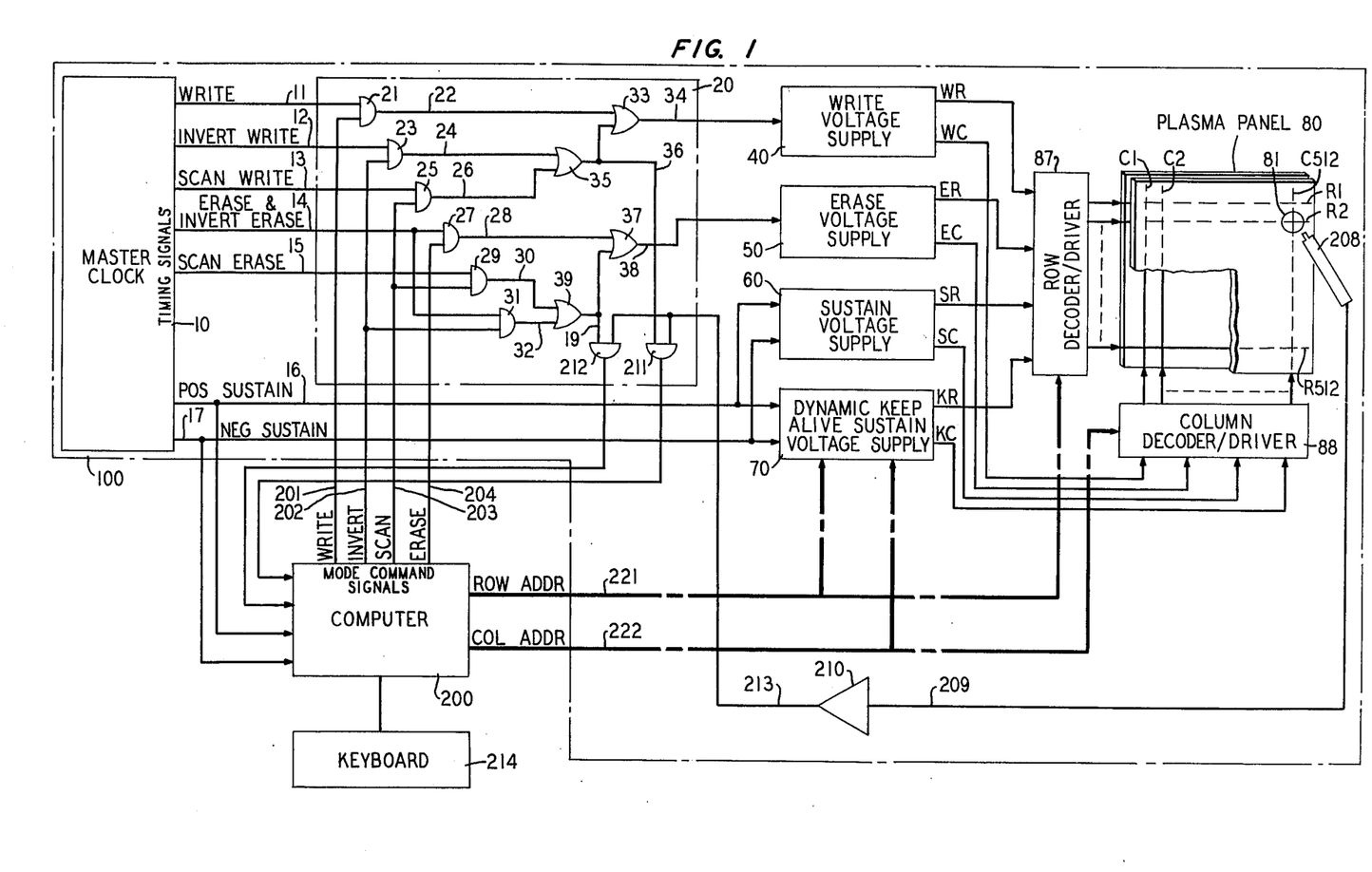
FIG. 1 depicts a plasma display system which includes cell-state-inversion circuitry in accordance with the invention.

FIG. 1 depicts a display system 100 at the heart of which is a matrix display device, illustratively plasma panel 80. Panel 80 is comprised of two dielectric plates, or surfaces, at least one of which is translucent, between which a continuous body of gaseous display material, such as neon, is sealed. A first set of 512 "column" conductors C1 through C512 is disposed on one plate in a generally vertical direction. A second set of 512 "row" conductors R1 thorugh R512 is disposed on the other plate in a generally horizontal direction. The conductors of each set are spaced very closely together at, for example, 60 lines per inch.

The individual regions of panel 80 defined by the overlappings, or crosspoints, of the various row and column conductors function as its display cells. Pictures, text and other graphical data are presented on the panel by creating individual glow discharges in the gas at selected crosspoints, illustratively under the control of digital computer 200. The latter is illustrated as being external to display system 100 in that, typically, the components within system 100 would be manufactured and sold as package to be connected to the purchaser's own computer or other control system. As indicated in waveform (A) of FIG. 2, a discharge is initiated at a particular cell of panel 80 such as cell 81 by impressing, or applying, a "write" pulse WP across the cell via its row and column conductor pair R2, C512, such as at time $t_1$. The magnitude $V_w$ of write pulse WP exceeds the breakdown voltage $V_b$ of the gaseous display material in the vicinity of cell 81. As a result, a space charge, or plasma, of electrons and positive ions is created in the crosspoint region. Concomitant avalanche multiplication creates a first glow charge and accompanying short, e.g., one microsecond, light pulse in the visible spectrum just after time $t_1$, as shown in waveform (C) of FIG. 2. Write pulse WP, which continues to be applied to the cell, begins to pull the space charge electrons and ions, or charge carriers, to opposite cell walls, i.e., the opposing dielectric surfaces in the crosspoint region. When write pulse WP terminates at time $t_2$, a positive "wall" voltage $e_m$ created by these so-called wall charges remains stored across the gas in the crosspoint region, as indicated in waveform (B). This wall voltage plays an important part in the subsequent operation of the panel, as will be seen shortly.

Figure 2:
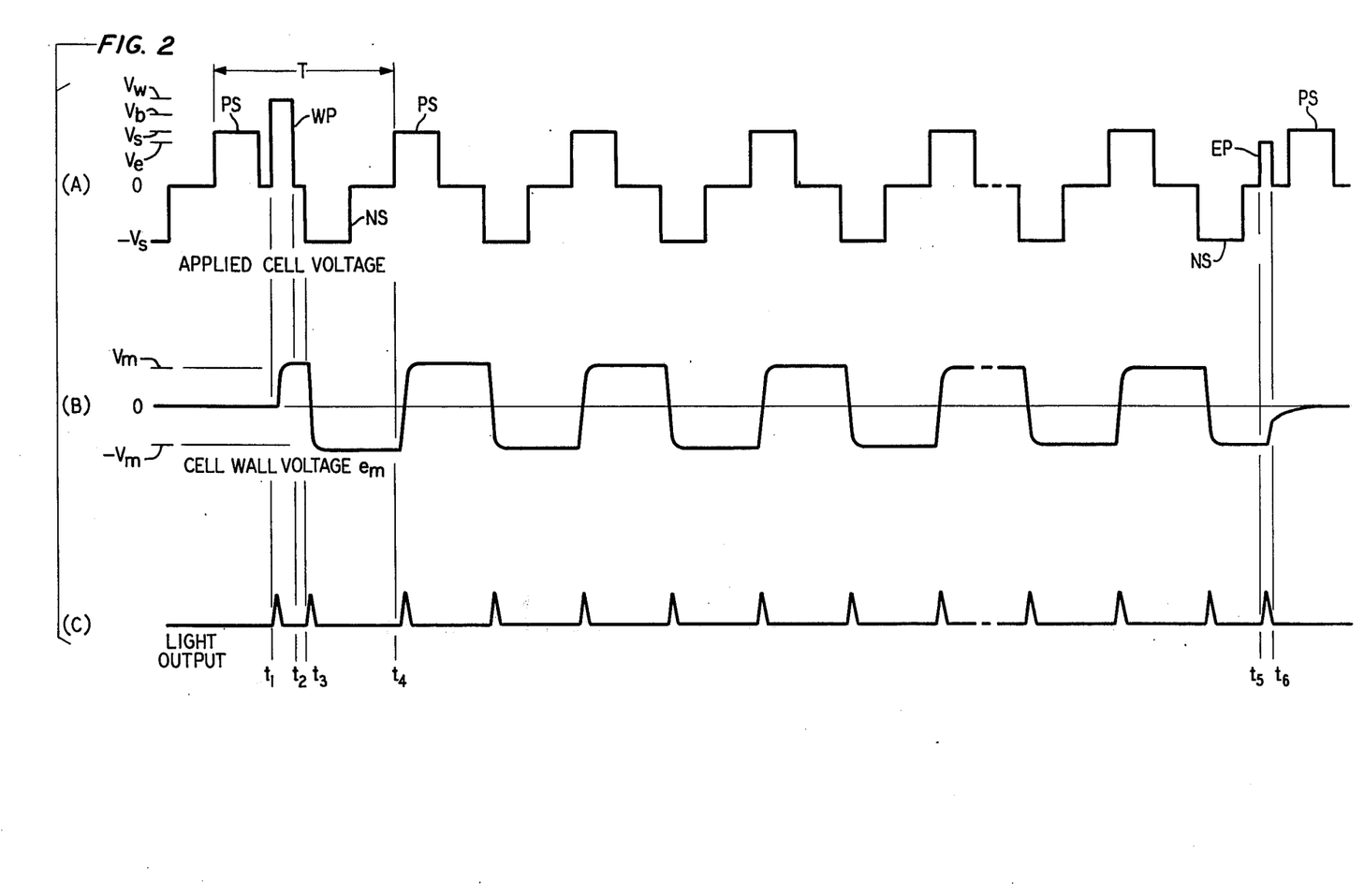
FIG. 2 shows several waveforms helpful in explaining the operation of the system of FIG. 1 to provide conventional write and erase functions.

A single short-duration light pulse cannot, of course, be detected by the human eye. Thus, in order to provide a plasma display cell with the appearance of being continuously light-emitting (ON, energized), further rapidly successive glow discharges and accompanying light pulses are needed. These are generated by a "sustain" signal which is impressed across each cell of the panel via its conductor pair. As indicated in waveform (A), the sustain signal illustratively comprises a train of alternating positive- and negative-polarity sustain pulses PS and NS, respectively. The magnitude $V_s$ of these sustain pulses is less than the breakdown voltage $V_b$. Thus, the voltage across cells not previously energized by a write pulse is insufficient to cause a discharge and those cells remain in a non-light-emitting state.

However, the voltage across the gas of a previously-energized cell, such as cell 81, comprises the superposition of the sustain voltage with the wall voltage $e_m$ previously stored at that cell. It will be noted that the sustain pulse which follows write pulse WP beginning at time $t_3$ is a negative sustain pulse NS. As a result, the wall voltage $e_m$ created by pulse WP combines additively with the negative sustain pulse across the display cell gas. The sum of the wall voltage with the sustain voltage across the gas may be assumed to exceed $V_b$ so that a second glow discharge and accompanying light pulse are created just after time $t_3$. The flow of carriers to the walls of cell 81 now establishes a wall voltage of negative polarity but of magnitude approximately equal to that which previously obtained. Thus the following positive sustain pulse beginning at time $t_4$ results in yet another discharge, and so forth. After several sustain cycles, the magnitude of wall voltage $e_m$ reaches a constant, characteristic level $V_m$ which is a function of the gas composition, panel dimensions, sustain voltage level, and other parameters. The sustain signal frequency may be on the order of 50 kHz. Thus, the light pulses of waveform (C) are fused by the eye of the viewer and cell 81 appears to be continuously energized.

Cell 81 is switched back to a non-light-emitting (OFF, de-energized) state by removing its wall charge. This is accomplished by applying an "erase" pulse EP to the cell such as at time $t_5$, again via conductor pair R2, C512. The magnitude of pulse EP is $V_e > V_b - V_m$. Thus, since positive pulse EP follows a negative sustain pulse NS, pulse EP causes a discharge at an ON cell, as the following positive sustain pulse PS would have. Wall voltage $e_m$ begins to reverse polarity. However, erase pulse EP is of such short duration relative to a sustain pulse that the wall voltage reversal is terminated prematurely, such as at time $t_6$, when the wall voltage magnitude is, illustratively, near zero. Thus, no further breakdowns occur and cell 81 is returned to a non-light-emitting state. The residuum of wall voltage $e_m$ eventually disappears due to recombination of the positive and negative charge carriers and diffusion thereof away from the crosspoint site.

Figure 3:
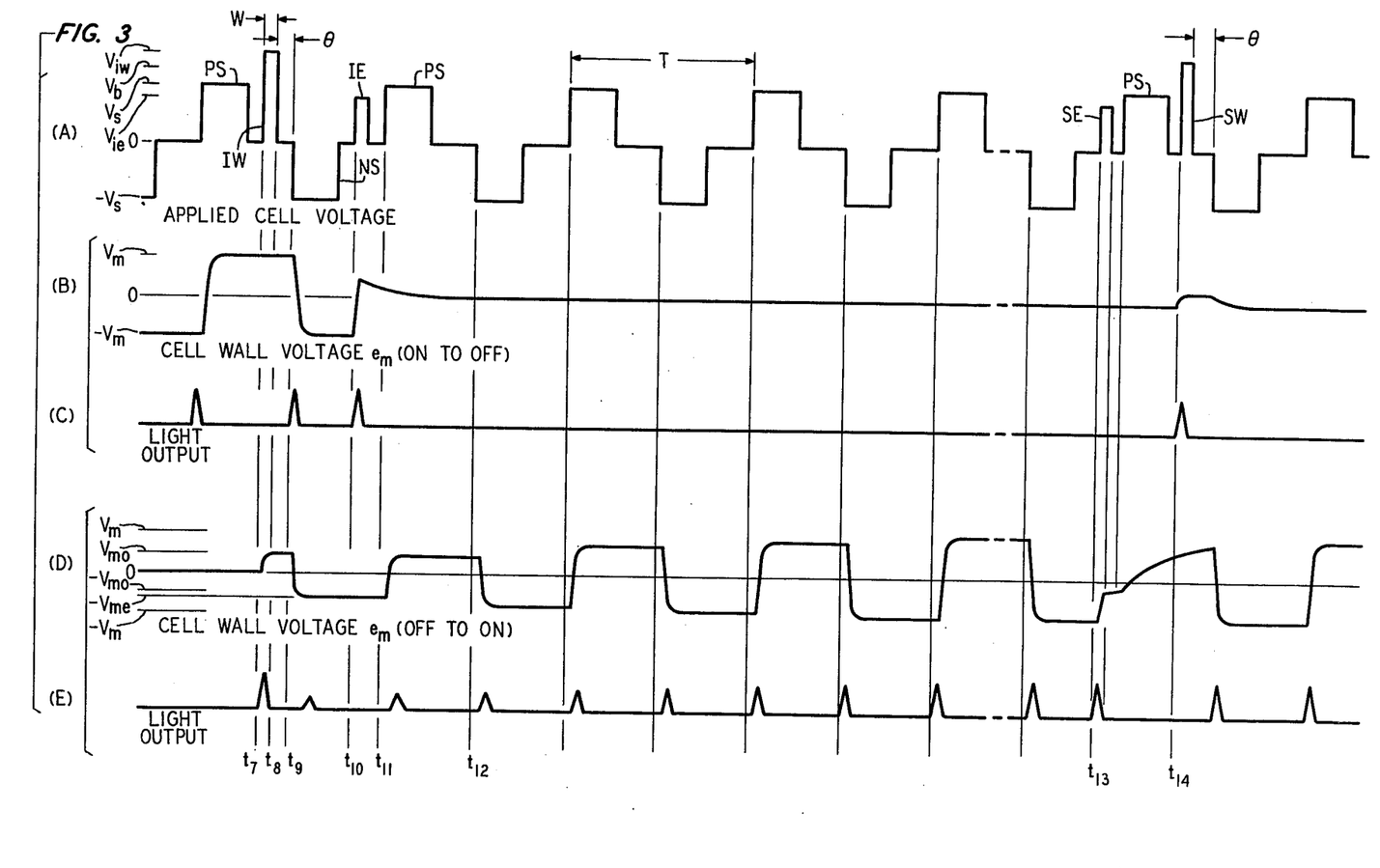
FIG. 3 shows several waveforms helpful in explaining the operation of the display system of FIG. 1 to provide cell state inversion in accordance with the invention.

The waveforms of FIG. 3 illustrate the principles of the present invention. In particular, waveform (A) of FIG. 3 depicts the two-pulse cell-state-inversion sequence of the invention. The first pulse of the sequence is positive-polarity "inverting write" pulse IW which is applied to the cell during the conventional write period, i.e., after a positive sustain pulse. The second pulse of the sequence is positive-polarity "inverting erase" pulse IE which is illustratively identical to conventional erase pulse EP.

Assume that cell 81 is to be inverted and that it is initially in an ON state. Its wall voltage $e_m$ varies between $V_m$ and $-V_m$ in response to alternating polarities of the sustain signal, as shown in waveform (B) of FIG. 3. Inverting write pulse IW is applied to the cell at time $t_7$, when $e_m$ is at $V_m$. Pulse IW combines subtractively rather than additively, with wallvoltage $e_m$. The combined voltage across the cell is thus less than $V_b$. Hence pulse IW has no effect on the cell state. However, since inverting erase pulse IE, which begins at time $t_{10}$ is illustratively identical to a conventional erase pulse, it inverts cell 81 to an OFF state, as desired. Waveform (C) of FIG. 3 shows the light output of the inverted cell.

Assume, on the other hand, that cell 81 is initially in an OFF state. Thus, as shown in waveform (D) of FIG. 3, its wall voltage $e_m$ is initially zero. The magnitude $V_{iw}$ of inverting write pulse IW is illustratively equal to the conventional write pulse magnitude $V_w$. Thus, as indicated in waveform (E) of FIG. 3, a glow discharge and accompanying light signal are induced in the cell just after time $t_7$. The duration W of inverting write pulse IW is illustratively less than that of conventional write pulse WP, however. Thus, when pulse IW terminates at time $t_8$, only a small wall voltage $V_{mo}$ has been created. However, it may be assumed that $V_{mo} + V_s > V_b$ so that the negative sustain pulse which begins at time $t_9$ causes a second gas breakdown. The magnitude of the wall voltage created in response to this sustain pulse is $V_{me}$.

One of the principal determinates of the magnitude of $V_{me}$ is the magnitude of $V_{mo}$, assuming predetermined sustain pulse magnitude and duration. This may be understood as follows: The magnitude of the voltage which causes a breakdown principally determines the size of the space charge created during that breakdown. It also determines the time at which breakdown occurs relative to the start of the voltage causing the breakdown. (The strength of the emitted light pulse is also a function of that voltage.) Illustratively, the combined voltage $V_{mo} + V_s$ impressed across cell 81 at time $t_9$ is relatively small, i.e., just a little larger than $V_b$. A relatively small space charge is created and breakdown occurs late in the sustain pulse. (The emitted light pulse is also very weak.) A substantial portion of the sustain pulse which began at time $t_9$ has already elapsed at this time. Thus, not all of the space charge carriers created at the time of breakdown are pulled to the cell walls by the end of that sustain pulse. However, it may be assumed that the new value of wall voltage, $V_{me}$, which is created is greater than the old value, $V_{mo}$. Thus, the breakdown created in response to the positive sustain pulse which begins at time $t_{11}$ creates a somewhat larger space charge and creates it earlier in the sustain pulse. At time $t_{12}$, then, the wall voltage magnitude is greater than $V_{me}$. After a number of sustain pulses, then, wall voltage $e_m$ reaches $V_m$. Cell 81 is thus established in an ON state which is indistinguishable from that which is created by a conventional write pulse.

In accordance with the invention, however, the magnitude of $V_{me}$, which is the value of wall voltage $e_m$ when inverting erase pulse IE is applied to cell 81 at time $t_{10}$, is such that its sum with pulse IE is less than the breakdown voltage, i.e., $V_{me} + V_e < V_b$ or, stated alternatively, $V_{me} < V_b - V_e$. As desired, then, there is no discharge and no change in the wall voltage in response to the inverting erase pulse. Thus, a cell inverted to an ON state by pulse IW is not returned to its original OFF state by pulse IE but is retained in that ON state.

The time interval, or period, $\theta$, which elapses between the end of any (e.g., conventional or inverting) write pulse and the start of the following sustain pulse is an important factor in the above-described wall charge build-up process. If $\theta$ is small, a sizable fraction of the space charge carriers created in response to pulse IW, but not pulled to the cell walls, are still present at time $t_9$. The presence of these carriers brings several mechanisms into play including, for example, a temporarily lowered breakdown voltage. This results in $V_{me}$ being larger than it would have been had that number of carriers not been present. For larger values, of $\theta$, more of the space charge created by pulse IW are allowed to disappear through recombination and diffusion away from the crosspoint site before the next discharge. This results in smaller $V_{me}$ and it takes an increasing number of sustain pulses to build up the wall voltage to $V_m$.

Figure 4:
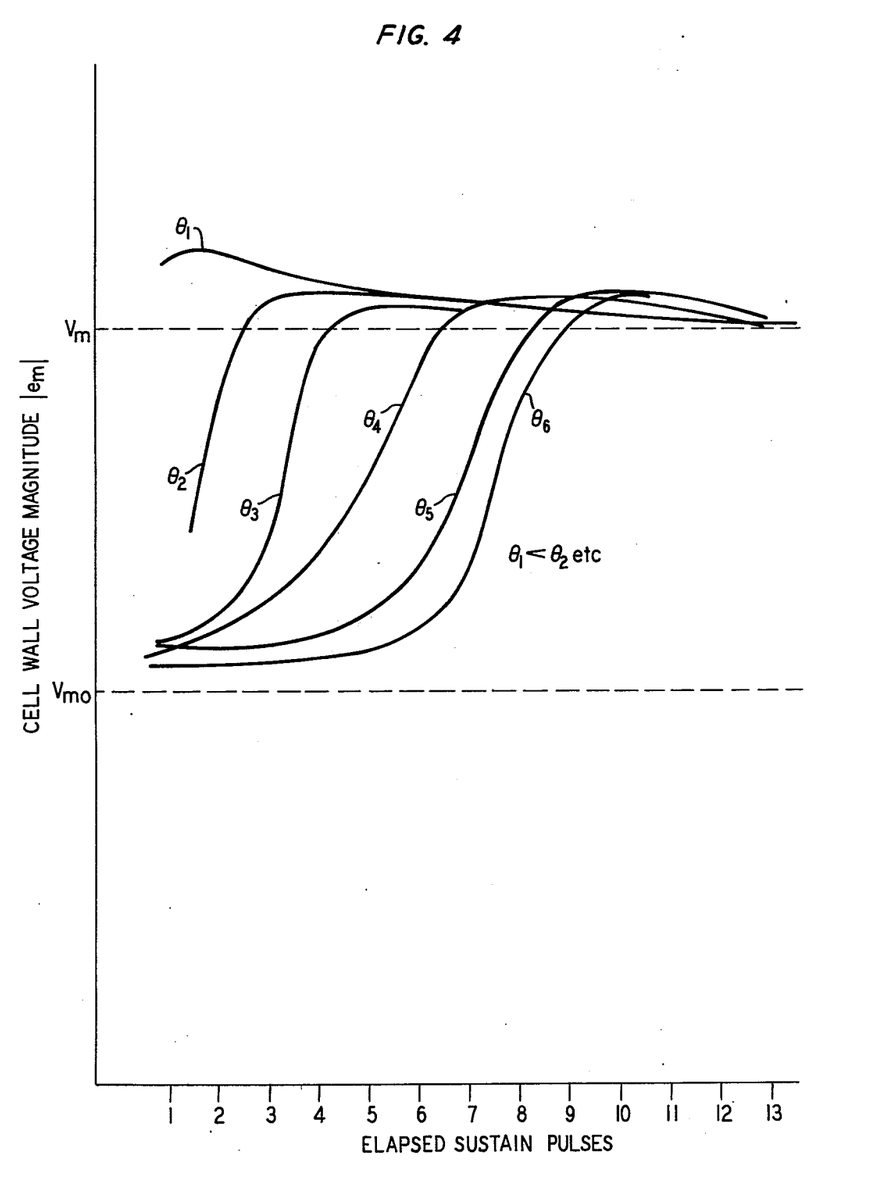
FIGS. 4 and 5 show respective graphs helpful in illustrating the above-described wall voltage build-up mechanism.

FIG. 4 illustrates how the wall voltage build-up varies with $\theta$, assuming a predetermined inverting write pulse magnitude and duration. If $\theta$ is sufficiently small, $e_m$ assumes the characteristic level $V_m$ in response to the immediately following sustain pulse, as is illustrated for $\theta_1$. As $\theta$ is increased ($\theta_1 < \theta_2$, etc.), it takes an increasing number of sustain pulses for the wall voltage to reach $V_m$. As FIG. 4 shows, the wall voltage may overshoot $V_m$ by a small amount before settling in at that value. (For the sake of simplicity, however, this overshoot is not shown in waveform (D) of FIG. 3).

Figure 5:
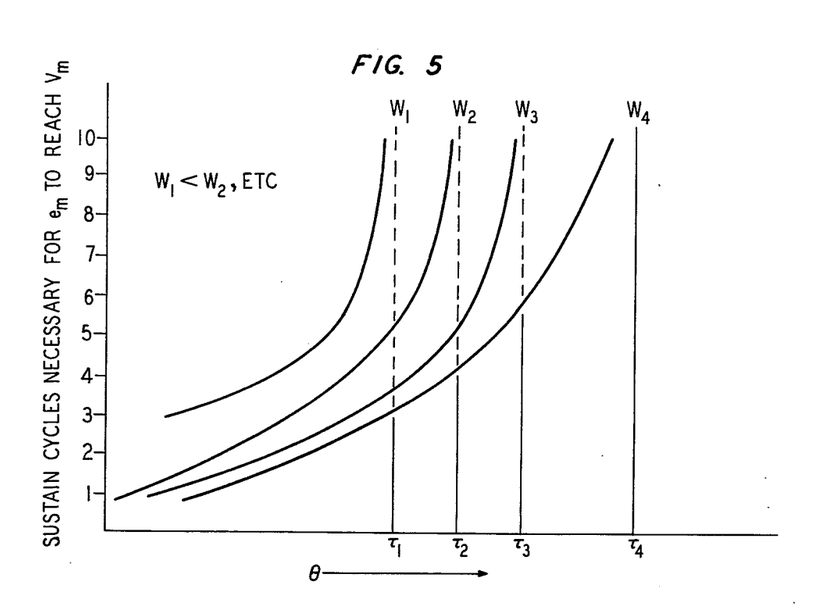

FIG. 5 illustrates that for fixed inverting write pulse magnitude $V_{iw}$, the number of sustain cycles necessary for the wall voltage $e_m$ to reach $V_m$ varies both with $\theta$ and the duration W of the pulse. Again, it is seen that increasing $\theta$ (for a given W) increases the number of sustain pulses necessary for the wall voltage to build up to $V_m$. In addition, more sustain pulses are necessary for a given $\theta$ as the inverting write pulse duration W is decreased ($W_1 < W_2 < W_3 < W_4$).

Referring, for example, to the graph for duration $W_1$, it will be seen that that graph asymptotically approaches a particular value of $\theta$, $\tau_1$, known as the "recovery time," beyond which no number of sustain pulses will build the wall voltage up to $V_m$. This is because for $\theta > \tau_1$ so many space charge carriers created in response to the initial breakdown are lost due to recombination or diffusion that the resultant value of $V_m$ is smaller than a threshold value necessary to provide a sequence of increasing wall voltages as previously described. In this case, the wall voltage magnitude degenerates over a number of sustain pulses and eventually returns to zero.

For a given panel, each combination of inverting write pulse magnitude and duration has its own associated recovery time. Thus in FIG. 5, the pulses having durations $W_2$, $W_3$ and $W_4$ have associated recovery times $\tau_2$, $\tau_3$ and $\tau_4$, respectively, again assuming the same inverting write pulse magnitude. The recovery time increases for greater pulse magnitudes because a greater space charge is initially created. Thus, more of it can afford to be lost. Since it is necessary in accordance with the present invention for a cell to which an inverting write pulse is applied to ultimately be established in an ON state, $\theta$ must be less than the recovery time associated with the chosen inverting write pulse magnitude and duration.

It will be appreciated from the foregoing that one designing a plasma panel system has a wide latitude in choosing signal parameters to provide cell state inversion in accordance with the invention. For example, as previously indicated, the conventional and inverting write pulses may have the same magnitude, thereby minimizing the cost and complexity of the design. The fact that the inverting erase pulse may be identical to a conventional erase pulse is a further significant factor contributing to the economy and simplicity of the present approach to plasma cell state inversion.

The organization of display system 100 and its operation in conjunction with computer 200 to provide the write, erase and inverting functions discussed above will now be explained.

Figure 6:
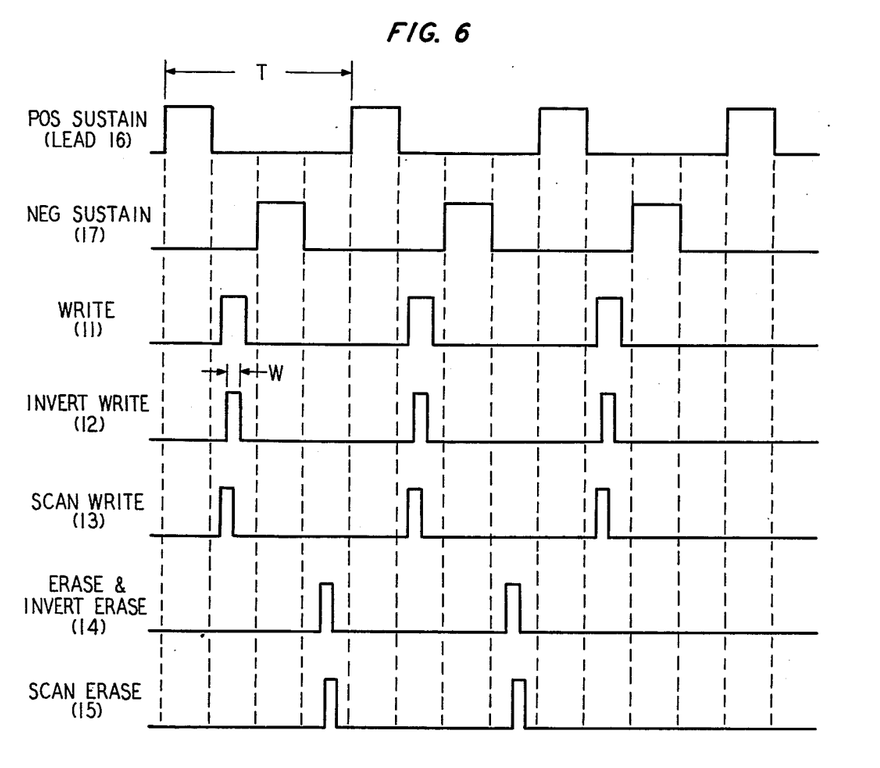
FIG. 6 shows several internal timing waveforms generated within the display system of FIG. 1.

Display system 100 includes a master clock 10 which controls the sequencing and duration of all signals applied to panel 80. To this end, clock 10 has seven logic level, e.g., 5 volt, output leads 11 through 17. As indicated in FIG. 6, the timing signals on each of these leads defines the initiation and termination point within each sustain cycle T of a different type of pulse applied to panel 80. For example, the timing signals on leads 16 and 17 define the periods within each sustain cycle during which positive and negative sustain pulses, respectively, are to be applied to the cells of the panel. Similarly, the timing signals on leads 11, 12 and 14 define the time periods within each sustain cycle during which write, inverting write and erase (both conventional and inverting) pulses, respectively, are to be applied to the panel. The timing signals on leads 13 and 15 are discussed hereinafter.

The sustain timing signals on leads 16 and 17 are applied to sustain voltage supply 60. This unit responds to each pulse on positive sustain timing lead 16 to provide a potential $V_s/2$ on row sustain lead SR and a potential $-V_s/2$ on column sustain lead SC. The potential on lead SR is coupled to each of row conductors R1 through R512 via row decoder/driver 87, while the potential on lead SC is coupled to each of column conductors C1 through C512 via column decoder/driver 88. No decoding function is performed by decoder/drivers 87 and 88 with respect to these potentials. A positive (row conductor to column conductor) sustain voltage of magnitude $V_s/2-(-V_s/2) = V_s$ is thus impressed across each crosspoint cell of panel 80. The potentials on leads SR and SC return to zero upon the termination of the pulse on lead 16.

Sustain voltage supply 60 responds to each pulse on negative sustain timing read 17 to provide the potentials $V_s/2$ and $-V_s/2$ on column and row sustain leads SC and SR, respectively, thereby impressing a voltage $(-V_s/2)-V_s/2) = -V_s$ across each cell for the duration of the lead 17 timing pulse.

Commands to apply write or erase pulses to a selected cell or cells of panel 80 or to apply thereto the two-pulse cell-state-inversion sequence of the present invention emanate from computer 200. Computer 200, in turn, may formulate such commands in response to any of several different stimuli. For example, the row and column address of a particular cell and the desired function, e.g., write, erase or invert, may be generated internally by computer 200 under program control. This mode of operation encompasses such applications as the display of internally generated graphs and charts. Alternatively, particular cells to be energized, de-energized or inverted may be identified to computer 200 by the user via, for example, keyboard 214 and/or a light pen 208, of which more hereinbelow. Or, computer 200 may receive instructions from anothr, remotely located computer via a data link established between them.

By way of example, let it be assumed that it is desired to apply a write pulse to cell 81. To do this, computer 200 generates multibit code words on row and column address cables 221 and 222, respectively, identifying R2 and C512 as the conductors defining the cell of interest. When the next positive transition on positive sustain timing lead 16 indicates to computer 200 that a new sustain cycle has begun, computer 200 provides a logic level 1 pulse on write command lead 201. This pulse, which will subsist on lead 201 for the entire sustain cycle, is applied to one input of AND gate 21. The other input signal for gate 21 is taken from lead 11. AND gate 21 operates in response to the next-occurring write timing pulse on lead 11 to pulse write voltage supply 40 via lead 22, OR gate 33 and lead 34.

Write voltage supply 40 thereupon provides a potential $V_w/2$ on row write lead WR and a potential $-V_w/2$ on column write lead WC. Row decoder/driver 87 decodes the row address on cable 221, and upon identifying conductor R2 as the row conductor defining the cell of interest, it couples the $V_w/2$ potential on lead WR through to conductor R2. Similarly, column decoder/driver 88 responds to the column address on cable 222 to couple the $-V_w/2$ potential on lead WC through to conductor C512. The potential across cell 81 is thus $V_w/2-(-V_w/2)=V_w$, i.e., the magnitude of write pulse WP. The signals on leads WR and WC are, of course, necessarily also applied to each other cell in row R2 and column C512, respectively. However, since these two potentials combine only across cell 81, only that cell receives a full-magnitude write pulse and hence only it is energized. The termination of the write timing signal on lead 11 terminates the pulse on lead 34 and thus the write pulse impressed across cell 81 by supply 40.

If, alternatively, it is desired to apply an erase pulse to cell 81, computer 200 generates an erase command pulse on lead 204, which is applied to one input of AND gate 27. The next-occurring pulse on erase and inverting erase timing lead 14 operates AND gate 27 to pulse erase voltage supply 50 via lead 28, OR gate 37 and lead 38. Supply 50 provides the potentials $V_2/2$ and $-V_e/2$ on leads ER and EC, respectively. Decoder/drivers 87 and 88 couple these potentials to row conductor R2 and column conductor C512, respectively, thereby impressing an erase pulse of magnitude $V_e$ across cell 81. This erase pulse terminates upon the termination of the timing pulse on lead 14.

It is desired to invert the state of cell 81 in accordance with the invention, computer 200 generates an invert command pulse on lead 202 at the start of a sustain cycle. The pulse on lead 202 is applied to one input of AND gate 23 and to one input of AND gate 31. The next-occurring timing pulse on lead 12 couples a pulse to write voltage supply 40 via lead 24, OR gates 35 and 33 and lead 34. The duration of the pulse on lead 12 and thus of the pulse applied to cell 81, is W, the predetermined inverting write pulse duration. Thereafter the next-occurring pulse on lead 14 operates AND gate 31 to pulse erase voltage supply 50 via lead 32, OR gates 39 and 37 and lead 38, thereby applying an inverting erase pulse to cell 81.

Many plasma display systems have a band of continuously energized cells around the panel periphery. These cells "enrich" the gaseous display material of the panel with free ions, electrons and photons, thereby advantageously lowering for example, the voltage necessary to ensure a reliable write operation. These so-called keep-alive cells are typically operated at a somewhat higher sustain potential than the other cells of the panel. Hence, they have their own sustain voltage supply, illustratively voltage supply 70. The latter, like sustain supply 60, operates in response to the timing signals on leads 16 and 17. The row and column components of the keep-alive sustain voltage are provided by supply 70 on leads KR and KC, respectively. These signals are illustratively coupled to the keep-alive cells of panel 80 via decoder/drivers 87 and 88, respectively. Of course, no decoding function is provided as to these keep-alive signals. The panel 80 keep-alive cells themselves are not shown in FIG. 1; in a commercial plasma panel they are typically blocked from view.

My copending application, Ser. No. 460,757, filed Apr. 15, 1974, now U.S. Pat. No. 3,979,638 issued Sept. 7, 1976, discloses that improved keep-alive operation is achieved via a dynamic keep-alive technique wherein the keep-alive sustan signals generated in a given sustain cycle are timed in accordance with the spatial position in the panel of a cell being addressed in that cycle. Voltage supply 70 illustratively includes dynamic keep-alive circuitry of that type, with the position of the cell currently addressed being identified to supply 70 via respective taps off of cables 221 and 222.

The cell-state-inversion capability with which the present invention provides a display system may be utilized to advantage in numerous applications. For example, the copending application of C. N. Judice, Ser. No. 542,863, filed on Jan. 21, 1975, now U.S. Pat. No. 3,937,878 issued Feb. 10, 1976, discloses a conditional replenishment technique for displaying animated "dithered" images on a plasma panel or similar bi-level display device. The state of each cell of the panel in a given frame of the animated image is compared to the state of the same cell in the previous frame. A cell is addressed only if its state has changed from one frame to the next. Thus, in transmitting the animated image over a data path to a remotely located display panel, only update information, i.e., information relating to cells which have changed state between frames, need be sent. Typically, both the cell address and new state must be transmitted since the receiving display system typically does not have a frame memory or other hardware to determine current cell states and thus to determine whether a write or an erase pulse is needed to change a cell from its current state. If, however, the receiving panel includes cell-state-inversion circuitry in accordance with the present invention, only the addresses of cells whose states have changed need be transmitted, thereby conserving the bandwidth and/or time necessary to transmit the image.

Another use to which the present cell-state-inversion technique can be put is to emphasize a particular region of a displayed image by inverting all of its cells to produce a negative version of the image in the region. Such emphasis can be further enhanced by continuously inverting and reinverting the particular panel region at a relatively slow rate, e.g., 3–15 Hz, thereby creating a flashing, or blinking effect. Advantageously, this blinking effect can be used to enhance the light-pen capability of a plasma display system, as will now be discussed.

Display system 100 includes light pen 208 and associated circuitry for ascertaining the location of the pen when it is held against the surface of panel 80. Pen 208 is responsive to a light pulse occurring adjacent its tip to generate a signal on lead 213 via amplifier 210, the signal indicating that a cell to which the pen is adjacent has emitted a light pulse. The display system identifies the location of pen 208 by applying so-called scanning signals to the cells of panel 80 in a predetermined pattern and causing each cell as it is scanned to "flash", i.e., emit a light pulse, at a time when the sustain pulses are not generating light pulses at ON cells of the panel. Those signals on lead 213 which are generated in response to the above-mentioned scanning signals are gated through to computer 200 in a manner to be described, while those generated in response to sustain pulses are blocked therefrom. Thus, when the computer receives a signal from pen 208, the location of the pen becomes known since the address of the last cell to be flashed is known.

Illustratively, display system 100 flashes a particular cell of panel 80 by applying thereto the two-pulse scan sequence disclosed, for example, in my copending application, S. R. Maliszuski Ser. No. 599,766, filed on July 28, 1975, now abandoned in favor of a continuation-in-part application, Ser. No. 726,534, filed on Sept. 27, 1976. As indicated in FIG. 3 hereof, this two-pulse sequence comprises scan-erase pulse SE, preceding a positive sustain pulse PS, and scan-write pulse SW following that sustain pulse. The scan erase pulse, which may begin at a time $t_{13}$, for example, is illustratively a delayed version of a normal erase pulse. The scan erase pulse causes a breakdown and light pulse at an ON cell, as shown in waveform (D) of FIG. 3, but its proximity to the following sustain pulse prevents depletion of the ON cell wall voltage. The cell is thus retained in its ON state.

Scan-write pulse SW, which may begin at a time $t_{14}$, for example, is illustratively similar in shape to the present inverting write pulse IW. Unlike pulse IW, however, the time period $\theta$ between the end of pulse SW and the beginning of the following sustain pulse exceeds the recovery time associated with a pulse of its magnitude and duration. Thus, as previously described in connection with FIG. 5, an OFF cell to which pulse SW is applied is not switched to an ON state, but rather is retained in its OFF state.

Referring now to FIGS. 1 and 6, it will be seen that clock 10 generates timing signals on leads 13 and 15 defining the placement and duration of scan write pulse SW and scan erase pulse SE, respectively. Computer 200 scans panel 80 to flash the cells thereof in "locking" for pen 208 on a one-cell-per-sustain-cycle basis. The cells are illustratively scanned left to right and top to bottom, the address of each successive cell to be scanned being updated on cables 221 and 222 in each sustain cycle. In particular, computer 200 generates a scan command pulse on lead 203 beginning, for example, at time $t_{13}$. The next-occurring scan erase timing pulse on lead 15 operates AND gate 29 to pulse erase voltage supply 50 via lead 30, OR gates 39 and 37, and lead 38. Thereafter, a scan write pulse is applied to the currently addressed cell in response to the next-occurring scan write timing signal on lead 13. The timing pulse on lead 13 operates AND gate 25 to pulse write voltage supply 40 via lead 26, OR gates 35 and 33 and lead 34.

Assume that pen 208 is held adjacent cell 81. If that cell is ON, a light pulse is emitted therefrom at a time when a pulse is present on output lead 19, of gate 39, e.g., just after time $t_{13}$. AND gate 212, responsive to the signals on leads 19 and 213, signals computer 200 to indicate that pen 208 is located over the cell defined by the current address on cables 221 and 222, i.e., cell 81, and that that cell is in an ON state.

If, on the other hand, cell 81 is OFF, a light pulse is emitted therefrom at a time when a pulse is present on output lead 36 of gate 35, e.g., just after time $t_{14}$. AND gate 211, responsive to the signals on leads 36 and 213, signals computer 200, again to indicate that the pen is located over cell 81, but now indicating that that cell is in an OFF state.

Computer 200 may provide any of a range of functions in response to the signals from gates 211 and 212. It may only be desired to have the current location of the pen noted in computer 200 with nothing more taking place immediately. Thus, for example, if an image is displayed on panel 80 corresponding to a schematic diagram of a electrical circuit, it may only be required that a particular element over which the pen has been placed, such as a resistor, be identified to a program then being executed in computer 200.

Or, it may be desired to use the pen to "write" or "draw" on the panel. Assume, for example, that the cells of panel 80 are all initially OFF and that pen 208 is moved over the panel surface by the user. If each cell of the panel is repetitively scanned in the manner described above, computer 200 can "track" the location of pen 208. In fact, once the initial position of the pen is determined, computer 200 may limit its scanning activity to a small region of cells in the immediate vicinity of the last known pen location in searching for the next pen location. If, for example, scanning is limited to a square region of 64 cells, that region can be fully scanned in approximately 1 millisecond. A human hand cannot move the pen outside this "tracking square" in such a short period. Thus, accurate and continuous tracking is assured. As each successive pen location is determined, computer 200 may extend a write signal thereto, for example, thereby achieving the effect of writing a bright line on a dark background.

An analogous procedure to that outlined above may be followed to achieve the effect of writing a dark line on a bright background by initially energizing all the cells of panel 80 and extending an erase pulse to each cell over which the pen passes. Furthermore, if desired in a given application, the states of cells over which pen 208 passes can be inverted by extending thereto the inverting write and inverting erase pulse sequence of the present invention.

A useful tool in many display system applications, particularly those involving computer-aided design work, is the ability to superimpose a distinctive, movable symbol, or "cursor" on the displayed image. The user moves the cursor from one position on the display panel to another by placing a light pen on the cursor and then moving the pen to the desired new cursor location. As the controlling computer tracks the light pen position, it moves the cursor along with it. If the pen is removed from the panel surface, the cursor simply remains at its last location.

In a computer-aided circuit design system, for example, the user may move the cursor from element to element of a displayed schematic circuit diagram, entering the value of each element on a keyboard, e.g., its resistance, capacitance, etc., as the cursor is moved thereover. A cursor is also a useful adjunct to a visual communication system in which individuals at physically separated display stations view the same image, such as a picture or a chart, each on his or her own display panel. Verbal, e.g., telephonic, discussion between the parties concerning what they are viewing can be supplemented in an advantageous manner by the use of a movable cursor to "point" to particular regions of the image.

A cursor is easily provided in a CRT or other display system having a frame memory since the display information obliterated by the cursor as it is moved across the panel is replenished from the frame memory. Typical plasma display systems have no such replenishment mechanism, however. Thus, cursor capability for a plasma display system has heretofore implied the necessity of additional hardware (such as a frame memory or circuitry to read and store the states of cells in the cursor path) to replenish the lost information.

Advantageously, the present invention provides a simple and inexpensive alternative to such arrangements. Computer 200 illustratively operates display system 100 in a cursor mode by repetitively inverting and reinverting every cell in a selected area of the panel, such as an 8-by-8 square of display cells, at a slow rate, e.g., 3–15 Hz. All cells of the square can be addressed for inversion in, typically, 1 millisecond. This region is thus distinguished on the panel as a cursor by virtue of a blinking effect created by the repetitive inversion and reinversion of the cells thereof. The cells within the cursor region may be rapidly and repetitively scanned via the above-described scan erase/scan write sequence between each cell inversion. When light pen 208 is placed on the cursor, its location is quickly identified by computer 200 and as the pen is moved, computer 200 is able to update the addresses of the cursor region to effectively move the cursor along with the pen. Since alternate "blinks" of the cursor restore the cells thereof to their original states, computer 200 need only ensure that each cell is inverted an even number of times in order to preserve the displayed information.

Although some specific uses for the cell-state-inversion technique of the invention have been described herein, numerous other uses of the invention may occur to those skilled in the art. For example, a panel could be scanned for light pen detection using the present two-pulse inverting sequence rather than the above-described scan pulse sequence. This capability has, in fact, been incorporated into display system 100. Note that both the inverting write and inverting erase pulses cause a gas breakdown and accompanying light pulse. In addition, a signal is applied to gate 211 via lead 36 during both inverting write and scan write pulses. Similarly, a signal is applied to gate 212 via lead 19 during both inverting erase and scan erase pulses. Disadvantageously, however, using the cell-state-inversion sequence to scan the panel means that computer 200 must reinvert each inverted cell. By contrast, this is not required when the scan erase and scan write pulses are used.

In addition, although the invention has been illustrated in conjunction with particular plasma display hardware, it is in no sense limited thereto. For example, display system 100 is illustratively capable of addressing only one cell of panel 80 at a time. Arrangements are known, however, wherein a number of cells can be addressed concurrently. In such systems, then, the two-pulse cell-state-inversion sequence of the present invention could be applied to a number of cells at once, such as all those cells in a given row of the above-described blinking cursor.

Furthermore, it will be appreciated that the designations herein "row" and "column", and "positive" and "negative" are arbitrary and may be interchanged herethroughout if done consistently.

Moreover, numerous different arrangements for generating signals and applying them to a plasma or similar matrix-addressed panel are known in the art. So too, numerous different sustain and other waveforms are known. Some of those arrangements, for example, superimpose write and other waveforms on the sustain signals, rather than applying them at mutually exclusive times, as in the illustrative embodiment. Those skilled in the art will be able to adapt virtually any of these known arrangements to achieve cell-state-inversion in accordance with the principles of the invention without departing from the spirit and scope thereof.

What is claimed is:

1. Circuitry for inverting a gas discharge display cell having light-emitting and non-light-emitting states from a current one of said states to the other, said cell comprising a volume of gas having an associated breakdown voltage and adapted to store voltages across said volume of gas, a characteristic voltage being stored at said cell when it is in said light-emitting state, said circuitry comprising first means for applying a first signal to said cell, said first signal storing a first voltage at said cell at a predetermined time if said current state is said non-light-emitting state, second means for repetitively applying first and second polarity sustain pulses of predetermined duration and predetermined voltage less than said breakdown voltage alternately to said cell, said sustain pulses causing said characteristic voltage to be stored at said cell in response to the storage of said first voltage thereat, thereby rendering said cell in a light-emitting state, and third means for applying an inverting erase signal of predetermined voltage to said cell at said predetermined time, the sum of said inverting erase signal voltage and said characteristic voltage being greater than said breakdown voltage, and the sum of said inverting erase signal voltage and said first voltage being less than said breakdown voltage, whereby said inverting erase signal renders said cell in a non-light-emitting state only if said current state is said light-emitting state.

2. The invention of claim 1 wherein said first signal comprises an inverting write pulse of said first polarity and of predetermined magnitude greater than said breakdown voltage followed by one of said second polarity sustain pulses.

3. The invention of claim 2 wherein said inverting write pulse has a predetermined duration and an associated recovery time and wherein said first means includes means for terminating said inverting write pulse prior to the initiation of said one of said sustain pulses by a predetermined time interval, said interval being less than said recovery time but being sufficiently large to establish said first voltage at less than the difference between said breakdown voltage and said inverting erase signal voltage.

4. The invention of claim 3 wherein said characteristic voltage exceeds the difference between said breakdown voltage and said sustain pulse voltage so that said sustain pulses combine additively with the voltage stored across said volume of gas when said cell is in said light-emitting state to cause repetitive glow discharges in said volume of gas and to repetitively reverse the polarity of said stored voltage.

5. The invention of claim 4 wherein said inverting erase signal is a pulse of said first polarity and wherein said predetermined time is a time subsequent to the application of said one of said sustain pulses to said cell and prior to the application thereto of the following sustain pulse.

6. A display system comprising
a plurality of display cells each comprising a respective volume of gas, each having an associated gas breakdown voltage and each adapted to store voltages across said volume of gas,
means for rendering individual ones of said cells in a light-emitting state by storing a characteristic voltage thereat,
first means for applying a first signal to a selected one of said cells, said first signal storing a first voltage at said selected cell during a predetermined time interval if said selected cell is not in a light-emitting state,
second means for repetitively applying first and second polarity sustain signals to each of said cells, said sustain signals each having a predetermined magnitude and duration and said sustain signals causing said characteristic voltage to be stored at said selected cell in response to the storage of said first voltage thereat, and
third means for applying an inverting erase signal of predetermined voltage to said selected cell during said predetermined interval, the sum of said inverting erase signal voltage and said characteristic voltage being greater than the breakdown voltage of said selected cell and the sum of said inverting erase signal voltage and said first voltage being less than the breakdown voltage of said selected cell.

7. The invention of claim 6 wherein said first means comprises means for applying a first polarity inverting write pulse having an associated recovery time to said selected cell prior to the application thereto of one of said second polarity sustain signals, said first means further comprising means for establishing the time interval between the termination of said inverting write pulse and the initiation of said one sustain signal at less than said recovery time but of sufficient duration to ensure that the magnitude of said first voltage is less than the difference between the breakdown voltage of said selected cell and said inverting erase signal voltage.

8. The invention of claim 7 wherein said predetermined interval comprises the interval between a successive two of said sustain signals and wherein said inverting erase signal is a pulse of polarity opposite that of the sustain signal which precedes said predetermined interval.

9. The invention of claim 8 wherein said first voltage magnitude is such that each of a plurality of sustain signals following said predetermined interval increases the voltage stored at said selected cell until it reaches said characteristic voltage.

10. The invention of claim 6 wherein said characteristic voltage exceeds the difference between the breakdown voltage of each of said cells and said sustain signal magnitude.

11. The invention of claim 10 wherein said means for rendering includes means for applying write signals to said individual ones of said cells, said write signals cooperating with ones of said sustain signals to store said characteristic voltage at said individual cells and said sustain signals combining with the characteristic voltage stored at said individual cells to create successive glow discharges and accompanying light signals thereat.

12. A display system comprising,
a display panel including first and second dielectric plates, a continuous layer of gaseous display material disposed between said plates, and a plurality of discharge cells each including a respective region of said gaseous display material and each having as walls thereof respective opposing regions of said plates,
means for repeatedly impressing individual sustain signals across each of said cells to maintain a characteristic level of charge stored at the walls of ones of said cells at which said characteristic level of charge is already stored,
means responsive to a command signal for impressing an inverting write signal across a selected one of said cells immediately before an individual one of said sustain signals is impressed thereacross, said inverting write signal being adapted to cause a first level of charge less than said characteristic level to be stored at the walls of said selected cell if substantially no charge is then stored thereat, said first level of charge being sufficiently large that said characteristic level of charge is thereafter stored at said selected cell in response to subsequent ones of said sustain signals, and
means responsive to said command signal for impressing an erase signal across said selected cell immediately after said individual one of said sustain signals is impressed thereacross, said erase signal being of sufficient magnitude to substantially remove charge stored at said selected cell if said characteristic level of charge is stored thereat but of insufficient magnitude to remove charge stored at said selected cell if said first level of charge is stored thereat.

13. The invention of claim 12 wherein said display panel further includes first and second sets of mutually orthogonal conductors disposed on respective ones of said plates, the overlapping of each orthogonal pair of said conductors defining the location in said panel of a respective one of said cells, and wherein said display system further includes means common to said first, second and third means for applying signals to an individual cell of said panel by applying respective portions of those signals to the pair of said conductors defining said individual cell.

14. A display system comprising
a plurality of gas discharge display cells having an associated breakdown voltage $V_b$,
sustain means for alternately applying first- and second-polarity sustain signals of predetermined duration and of magnitude $V_s$ less than $V_b$ to each of said cells, each of said sustain signals creating a glow discharge and accompanying light signal at ones of said cells at which a wall voltage $V_m$ greater than $(V_b - V_s)$ has been previously stored,
inverting write means operative for applying a first signal to ones of said cells and operative in conjunction with said sustain means to store a wall voltage $V_m$ thereat if such wall voltage has not already been stored thereat,
inverting erase means operative for applying a second signal of magnitude $V_e$ greater than $(V_b - V_m)$ to ones of said cells, and
means responsive to a command signal for effecting operation of said inverting write and inverting erase means to apply said first and second signals to a selected one of said cells immediately before and after, respectively, an application of one of said sustain signals to said selected cell, the termination of said first signal preceding the initiation of said one of said sustain signals by an interval $\theta$, said inverting write means comprising means for establishing the wall voltage of said selected cell at a level $V_{me}$ less than $(V_b-V_e)$ during said operation of said inverting erase means and at $V_m$ thereafter.

15. The invention of claim 14 wherein said first signal comprises an inverting write pulse of said first polarity, of predetermined duration and of predetermined magnitude greater than $V_b$, wherein said second signal comprises an inverting erase pulse of said first polarity and wherein said one of said sustain signals is of said second polarity.

16. The invention of claim 15 wherein said wall voltage establishing means comprises means for establishing $\theta$ at a value which is less than the recovery time associated with said inverting write pulse.

17. A method for inverting a gas discharge display cell having light-emitting and nonlight-emitting states from a current one of said states to the other, said cell comprising a volume of gas having an associated breakdown voltage and adapted to store voltages across said volume of gas, a characteristic voltage being stored at said cell when it is in said light-emitting state, said method comprising the steps of applying a first signal to said cell, said first signal storing a first voltage at said cell at a predetermined time if said current state is said non-light-emitting state, repetitively applying first and second polarity sustain pulses of predetermined duration and predetermined voltage less than said breakdown voltage alternately to said cell, said sustain pulses causing said characteristic voltage to be stored at said selected cell in response to the storage of said first voltage thereat, thereby rendering said cell in a light-emitting state, and applying an inverting erase signal of predetermined voltage to said cell at said predetermined time, the sum of said inverting erase signal voltage and characteristic voltage being greater than said breakdown voltage, and the sum of said inverting erase signal voltage and said first voltage being less than said breakdown voltage, whereby said inverting erase signal renders said cell in a non-light-emitting state only if said current state is said light-emitting state.

18. The invention of claim 17 wherein said first signal comprises an inverting write pulse of said first polarity and of predetermined magnitude greater than said breakdown voltage followed by one of said second polarity sustain pulses.

19. The invention of claim 18 wherein said inverting write pulse has a predetermined duration and an associated recovery time and wherein said first signal applying step includes the step of terminating said inverting write pulse prior to the initiation of said one of said sustain pulses by a predetermined time interval, said interval being less than said recovery time but being sufficiently large to establish said first voltage at less than the difference between said breakdown voltage and said inverting erase signal voltage.

20. The invention of claim 19 wherein said characteristic voltage exceeds the difference between said breakdown voltage and said sustain pulse voltage so that said sustain pulses combine additively with the voltage stored across said volume of gas when said cell is in said light-emitting state to cause repetitive glow discharges in said volume of gas and to repetitively reverse the polarity of said stored voltage.

21. The invention of claim 20 wherein said inverting erase signal is a pulse of said first polarity and wherein said predetermined time is a time subsequent to the application of said one of said sustain pulses to said cell and prior to the applicationn thereto of the following sustain pulse.

22. A method for use in a display system including a plurality of display cells each comprising a respective volume of gas, each having an associated gas breakdown voltage and each adapted to store voltages across said volume of gas, individual ones of said cells being in a light-emitting state during which a characteristic voltage is stored, said method comprising the steps of applying a first signal to a selected one of said cells, said first signal storing a first voltage at said selected cell during a predetermined time interval if said selected cell is not in a light-emitting state, repetitively applying first and second polarity sustain signals to each of said cells, said sustain signals each having a predetermined magnitude and duration, said sustain signals causing said characteristic voltage to be stored at said selected cell in response to the storage of said first voltage thereat, and applying an inverting erase signal of predetermined voltage to said selected cell during said predetermined interval, the sum of said inverting erase signal voltage and said characteristic voltage being greater than the breakdown voltage of said selected cell and the sum of said inverting erase signal voltage and said first voltage being less than the breakdown voltage of said selected cell.

23. The invention of claim 22 wherein said first signal applying step comprises the step of applying a first polarity inverting write pulse having an associated recovery time to said selected cell prior to the application thereto of one of said second polarity sustain signals, said first signal applying step comprising the further step of establishing the time interval between the termination of said inverting write pulse and the initiation of said one sustain signal at less than said recovery time but of sufficient duration to ensure that the magnitude of said first voltage is less than the difference between the breakdown voltage of said selected cell and said inverting erase signal voltage.

24. The invention of claim 23 wherein said predetermined interval comprises the interval between a successive two of said sustain signals and wherein said inverting erase signal is a pulse of polarity opposite that of the sustain signal which precedes said predetermined interval.

25. The invention of claim 24 wherein said first voltage magnitude is such that each of a plurality of sustain signals following said predetermined interval increases the voltage stored at said selected cell until it reaches said characteristic voltage.

26. A method for use in a display system which includes a display panel comprising first and second dielectric plates, a continuous layer of gaseous display material disposed between said plates, and a plurality of discharge cells each including a respective region of said gaseous display material and each having as walls thereof respective opposing regions of said plates, said method comprising the steps of repeatedly impressing individual sustain signals across each of said cells to maintain a characteristic level of charge stored at the walls of ones of said cells at which said characteristic level of charge is already stored, impressing an inverting write signal across a selected one of said cells immediately before an individual one of said sustain signals is impressed thereacross, said inverting write signal being adapted to cause a first level of charge less than said characteristic level to be stored at the walls of said selected cell if substantially no charge is then stored thereat, said first level of charge being sufficiently large that said characteristic level of charge is thereafter stored at said selected cell in response to subsequent ones of said sustain signals, and impressing an erase signal across said selected cell immediately after said individual one of said sustain signals is impressed thereacross, said erase signal being of sufficient magnitude to substantially remove charge stored at said selected cell if said characteristic level of charge is stored thereat but of insufficient magnitude to remove charge stored at said selected cell if said first level of charge is stored thereat.

* * * * *

UNITED STATES PATENT AND TRADEMARK OFFICE
CERTIFICATE OF CORRECTION

PATENT NO. : 4,030,091
DATED : June 14, 1977
INVENTOR(S) : Peter Dinh-Tuan Ngo

It is certified that error appears in the above-identified patent and that said Letters Patent are hereby corrected as shown below:

Column 1, line 20, "at" should read --as--. Column 3, line 12, "originally" mispelled; line 27-28, "above/mentioned" should read --above-mentioned--; line 61, "the" should read --that--. Column 7, line 42, "$V_m$" should read --$V_{me}$--. Column 8, line 45, "$(-V_s/2)-V_s/2)$" should read --$(-V_s/2)-(V_s/2)$-- line 62, "another" mispelled. Column 9, line 5, "level 1" should read --level "1"--; line 38, "$V_2$" should read --$V_e$--. Column 10, line 15, "sustain" mispelled. Column 11, line 15, "Maliszewski" mispelled; line 43-44, "locking" should read --looking--.

Signed and Sealed this

Sixth Day of October 1981

[SEAL]

*Attest:*

*Attesting Officer*

GERALD J. MOSSINGHOFF

*Commissioner of Patents and Trademarks*